(12) United States Patent
Feng et al.

(10) Patent No.: US 6,644,143 B2
(45) Date of Patent: Nov. 11, 2003

(54) GRIP GEAR-SHIFTER FOR ACTUATING DERAILLEUR OF BICYCLE

(75) Inventors: Chan-Hua Feng, Chiai (TW); Jen-Ji Wang, Changhua (TW); I-Chao Yan, Chiai (TW); Te-Sheng Tseng, Changhua (TW)

(73) Assignee: National Science Council (TW)

( * ) Notice: Subject to any disclaimer, the term of this patent is extended or adjusted under 35 U.S.C. 154(b) by 46 days.

(21) Appl. No.: 09/849,054

(22) Filed: May 3, 2001

(65) Prior Publication Data

US 2002/0000136 A1 Jan. 3, 2002

(30) Foreign Application Priority Data

May 4, 2000 (TW) ...................................... 89207397 U

(51) Int. Cl.[7] ................................................. F16C 1/10
(52) U.S. Cl. ....................................... 74/502.2; 74/575
(58) Field of Search ............................ 74/502.2, 501.6, 74/500.5, 577 R, 577 S, 575, 473.3, 473.13, 473.14, 473.15

(56) References Cited

U.S. PATENT DOCUMENTS 5,588,925 A  * 12/1996 Arbeiter et al. ............. 474/128
5,660,083 A  *  8/1997 Huang et al. ............. 74/473.13
5,676,020 A  * 10/1997 Jordan et al. ............. 74/473.14
6,067,875 A  *  5/2000 Ritchey et al. ............. 74/502.2
6,209,413 B1 *  4/2001 Chang ......................... 74/489

FOREIGN PATENT DOCUMENTS

WO    WO 200007871 A1 *  2/2000 .......... B62M/25/04

* cited by examiner

*Primary Examiner*—David Fenstermacher
(74) *Attorney, Agent, or Firm*—MacPherson Kwok Chen & Heid LLP

(57) ABSTRACT

A grip gear-shifter for being used in actuating a derailleur of a bicycle is provided. The grip gear-shifter includes a return spring, a resilient steel plate having a polyhedron-formed controlling pawl, a guiding ring having a guiding notch for guiding a cable, a first module for lodging and positioning said controlling pawl when the bicycle are in the state of shifting gears, and a second module having a projection and a positioning unit for operating in coordination with the return spring and the resilient steel plate, thereby forming a relative motion of the resilient steel plate and the first module to correctly shift gears when the bicycle are in the state of shifting gears.

15 Claims, 8 Drawing Sheets

GRIP GEAR-SHIFTER FOR ACTUATING DERAILLEUR OF BICYCLE

FIELD OF THE INVENTION

The present invention relates to a gear-shifter, and more particularly to a grip gear-shifter for being used in actuating derailleur of a bicycle.

BACKGROUND OF THE INVENTION

The conventional gear-shifter used in a bicycle whish has a derailleur is actuated by the drive of different gears of the conventional gear-shifter.

In the conventional gear-shifter includes a gear, a roller chain, the front and rear gearbox, shift levers and a cable for actuating the gear-shifter. According to the motion types, the shift levers could be classified into the single-lever type, the reversal double-lever type and the grip type.

The prior art disclosed a single-lever type of gear-shifter used in a bicycle. However, the single-lever type of gear-shifter has a too broad motion range to be conveniently operated by the user. The palm of the user would be uncomfortable when the user holds the lever. In addition, the single-lever type of gear-shifter is used for positioning by using friction. Thus, the lever could not provide sufficient clasping strength to maintain the roller chain in the correctly position when the bicycle is used in a vibrated environment.

The prior art further disclosed a reversal double-lever type of the gear-shifter used in a bicycle. The reversal double-lever type of the gear-shifter could be used for precisely and stably positioning even in an adverse environment. However, the levers are connected to two mechanisms for positioning. Thus, the assembly of the levers and mechanisms are complicate and time-consuming, and certainly the fabrication cost is increased. The reversal double-lever type of gear-shifter is suitable foe being used in a high priced bicycle.

Moreover, the prior art disclosed grip type of gear-shifters having simple mechanisms for decreasing assembly time and fabrication cost. However, when the conventional grip type of gear-shifter is operated, the grip is usually overshot by the over applying force owing to the geometric limitation. In addition, the conventional grip type of gear-shifter is operated unstably, so that the skip shift is usually occurred in the bicycle used in a vibrated environment. In order to overcome the problem about skip shift, the resilient steel plate and the friction between the resilient steel plate and the notches should be provided in the gear-shifter. However, the friction between the resilient steel plate and the notches should be overcome when the bicycle is in the state of shifting gears. Thus, the resilient steel plate and the notches would be abraded.

In order to overcome the foresaid drawbacks of the conventional gear-shifters, the present invention provides a grip gear-shifter for being used in actuating a derailleur of a bicycle.

SUMMARY OF THE INVENTION

It is therefore an object of the present invention to provide a grip gear-shifter having high stability for positioning and saving labor.

It is another object of the present invention to provide a grip gear-shifter having a simple mechanism for being easily assembled.

It is another object of the present invention to provide a grip gear-shifter for reducing the fabrication cost and assembly time.

In accordance with the present invention, the grip gear-shifter for being used in actuating derailleur of a bicycle includes a return spring, a resilient steel plate having a polyhedron-formed controlling pawl, a guiding ring having a guiding notch for guiding a cable, a first module for lodging and positioning the controlling pawl when the bicycle are in the state of shifting gears, and a second module having a projection and a positioning unit for operating in coordination with the return spring and the resilient steel plate, thereby forming a relative motion of the resilient steel plate and the first module to correctly shift gears when the bicycle are in the state of shifting gears.

Preferably, the resilient steel plate is U-shaped.

The second nodule includes an operating grip having plural fixing slots for being used in operations of up-shift and down-shift, and a rubber cover for covering the operating grip handled by a user.

The operating grip includes the projection and the positioning unit for pressing the return spring to form a resilience due to the deformation.

The positioning unit comprises a positioning lump and a contacting portion.

The rubber cover has plural protruding portions for suiting the fixing slots of the operating grip to prevent the rubber cover from falling from the operating grip when the operating grip covered by the rubber cover is twisted by the user.

In addition, the first module includes a fixing main body for securing the grip gear-shifter to the bicycle, a grip-fixing element having a flange for lodging in an annular slot of the operating grip to fix the operating grip, a positioning slide having plural notches for being lodged by the controlling pawl and positioning the controlling pawl when the bicycle is in the state of shifting gears, a clamping element for suiting the fixing main body and fixing the fixing main body to a handlebar of the bicycle, and a cable timer disposed at a wound end of the cable for adjusting the tension of the cable.

The fixing main body further has a first hole and a second hole thereon for conveniently assisting windup of the cable, thereby the cable is pulled through the first hole, pushed in the guiding notch and further pulled from the second hole, wherein the second hole has external threads.

The fixing main body further includes a first cylinder and a second cylinder for respectively slipping into the guiding ring and the operating grip, a receiver for receiving the positioning slide, and a square-shaped slot for receiving the grip-fixing element.

The cable trimmer could have internal threads for screwing in coordination with the external threads of the second hole, thereby adjusting the tension of said cable.

In accordance with the present invention, the grip gear-shifter for being used in actuating derailleur of a bicycle includes a return spring, a resilient steel plate having a polyhedron-formed controlling pawl, a guiding ring having a guiding slot and a circular indent for guiding and receiving a cable, a spring slot for receiving the return spring and a guiding notch for receiving the resilient steel plate, a first module for lodging and positioning the controlling pawl when the bicycle are in the state of shifting gears, and a second module having a projection and a positioning unit for operating in coordination with the return spring and the resilient steel plate, thereby forming a relative motion of the resilient steel plate and the first module to correctly position said derailleur when said bicycle are in said state of shifting gears.

The second module includes an operating grip having plural fixing slots for being used in operations of up-shift and down-shift, and a rubber cover for covering the operating grip handled by a user.

The operating grip includes the projection and the positioning lump for pressing the return spring to form a resilience due to the deformation.

The first module includes a fixing main body for securing the grip gear-shifter to the bicycle, a grip-fixing element having a flange for lodging in an annular slot of the operating grip to fix the operating grip, a positioning slide having plural notches for being lodged by the controlling pawl and positioning the controlling pawl when said bicycle is in the state of shifting gears, a clamping element for suiting the fixing main body and fixing the fixing main body to a handlebar of the bicycle, and a cable trimmer disposed at a wound end of the cable for adjusting the tension of the cable.

In accordance with the present invention, the grip gear-shifter for being used in actuating derailleur of a bicycle includes a return spring, a resilient steel plate having a polyhedron-formed controlling pawl, a guiding ring having a guiding slot and a circular indent for guiding and receiving a cable, a spring slot for receiving the return spring and a guiding notch for receiving the resilient steel plate, an operating grip having plural fixing slots for being used in operations of up-shift and down-shift, a rubber cover for covering the operating grip handled by a user, a fixing main body for securing the grip gear-shifter to the bicycle, a grip-fixing element having a flange for lodging in an annular slot of the operating grip to fix the operating grip, a positioning slide having plural notches for being lodged by the controlling pawl and positioning the controlling pawl when the bicycle is in the state of shifting gears, a clamping element for suiting the fixing main body and fixing the fixing main body to a handlebar of the bicycle, and a cable trimmer disposed at a wound end of the cable for adjusting the tension of the cable.

In addition, the fixing main body further has a first hole and a second hole thereon for conveniently assisting windup of the cable, thereby the cable is pulled through the first hole, pushed in the guiding notch and further pulled from the second hole, wherein the second hole has external threads.

The fixing main body further includes a first cylinder and a second cylinder for respectively slipping into the guiding ring and the operating grip, a receiver for receiving the positioning slide, and a square-shaped slot for receiving the grip-fixing element.

The operating grip includes a projection and a positioning unit for pressing the return spring to form a resilience due to the deformation.

The positioning unit includes a positioning lump and a contacting portion.

The cable trimmer could have internal threads for screwing in coordination with the external threads of the second hole, thereby adjusting the tension of the cable.

The present invention may best be understood through the following descriptions with reference to the accompanying drawings, in which:

DETAILED DESCRIPTION OF THE PREFERRED EMBODIMENTS

The present invention provides a grip gear-shifter for being used in a derailleur of a bicycle. The grip gear-shifter includes an operating grip for being used in operations of up-shift and down-shift, a rubber cover for covering the operating grip handled by a user, a clamping element for fixing the grip gear-shifter to the handlebar of the bicycle, a fixing main body for securing the grip gear-shifter to the bicycle, a cable trimmer disposed at a wound end of the cable for adjusting the tension of the cable, a grip fixing element for fixing the operating grip, a positioning slide for positioning the gear-shifter corresponding to the shift angle of the gears, a return spring for returning the operating grip to the initial position by the resilience of the return spring when the bicycle in the states of shifting gears, a resilient steel plate for lodging in the fixing main body, a guiding ring for guiding the cable in a fixed path.

Figure 1:
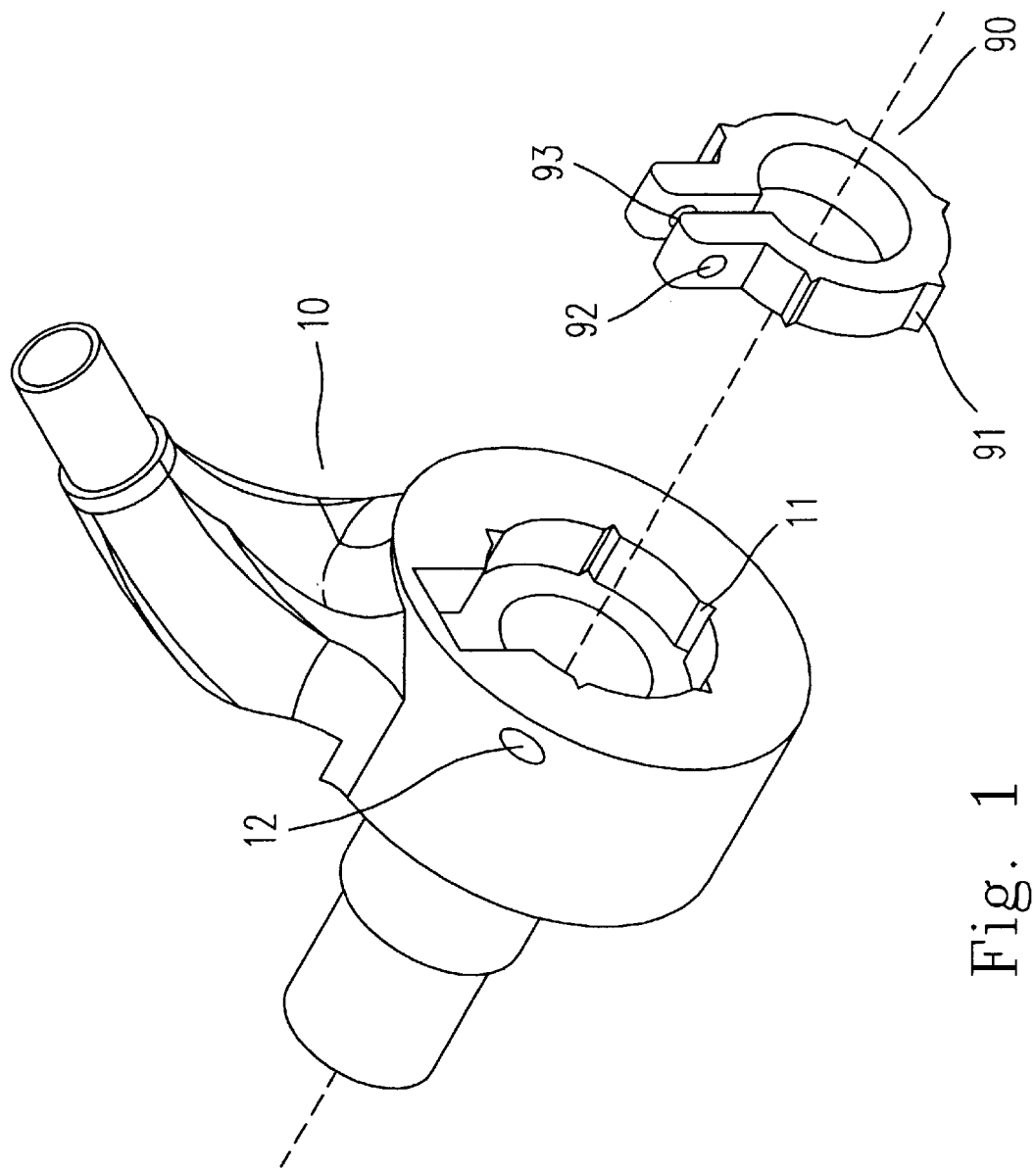
FIG. 1 is a schematic view showing the connective relation between the clamping element and the fixing main body according to the preferred embodiment of the present invention.

Please refer to FIG. 1. showing the connective relation between the clamping element 90 and the fixing main body 10. The clamping element has plural detents 91 for being lodged in detent slots 11 of the fixing main body 10. The clamping element 90 has an aperture 92 and an aperture 93 having internal threads for a screw fastening into, wherein the screw is fastened through a fish-eye-shaped aperture 12 on the fixing main body 10. Thus, the clamping element 90 and fixing main body 10 could be tightly fastened to the handlebar of the bicycle to avoid the gear-shifter falling from the handlebar when the bicycle is used in an adverse environment.

Figure 2:
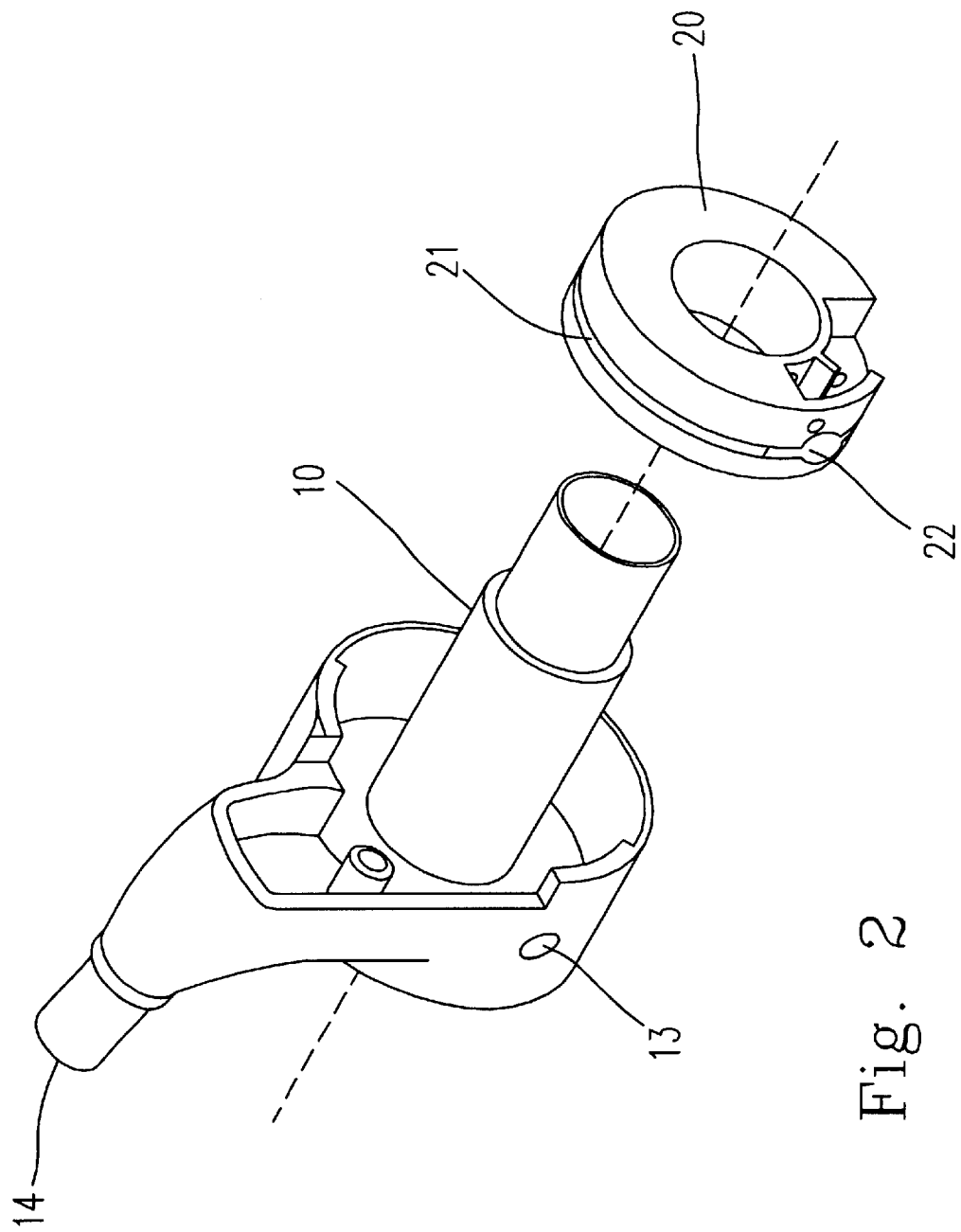
FIG. 2 is a schematic view showing the connective relation between the fixing main body and the guiding ring according to the preferred embodiment of the present invention.

Please refer to FIG. 2 showing the connective relation between the guiding ring 20 and the fixing main body 10. The guiding ring 20 has a guiding slot 21 for retaining the cable along the periphery of the guiding ring 20 and a circular indent 22 disposed tangentially to the guiding slot 21 for burying one end of the cable. In addition, the fixing main body 10 has a first hole 13 having a trumpet-shaped path which is inward narrowed. Therefore, the cable could be pushed through the first hole 13, wound along the guiding slot 21 and further pulled out from a second hole 14 of the fixing main body 10. Then, the cable is adjusted by the cable trimmer and the cable is connected to the front and rear gearbox, so that the four link-shaft mechanism is actuated, wherein one end of the cable is smoothly buried into the circular indent 22. Hence, the convenience for changing and threading cable is much increased.

Figure 3A:
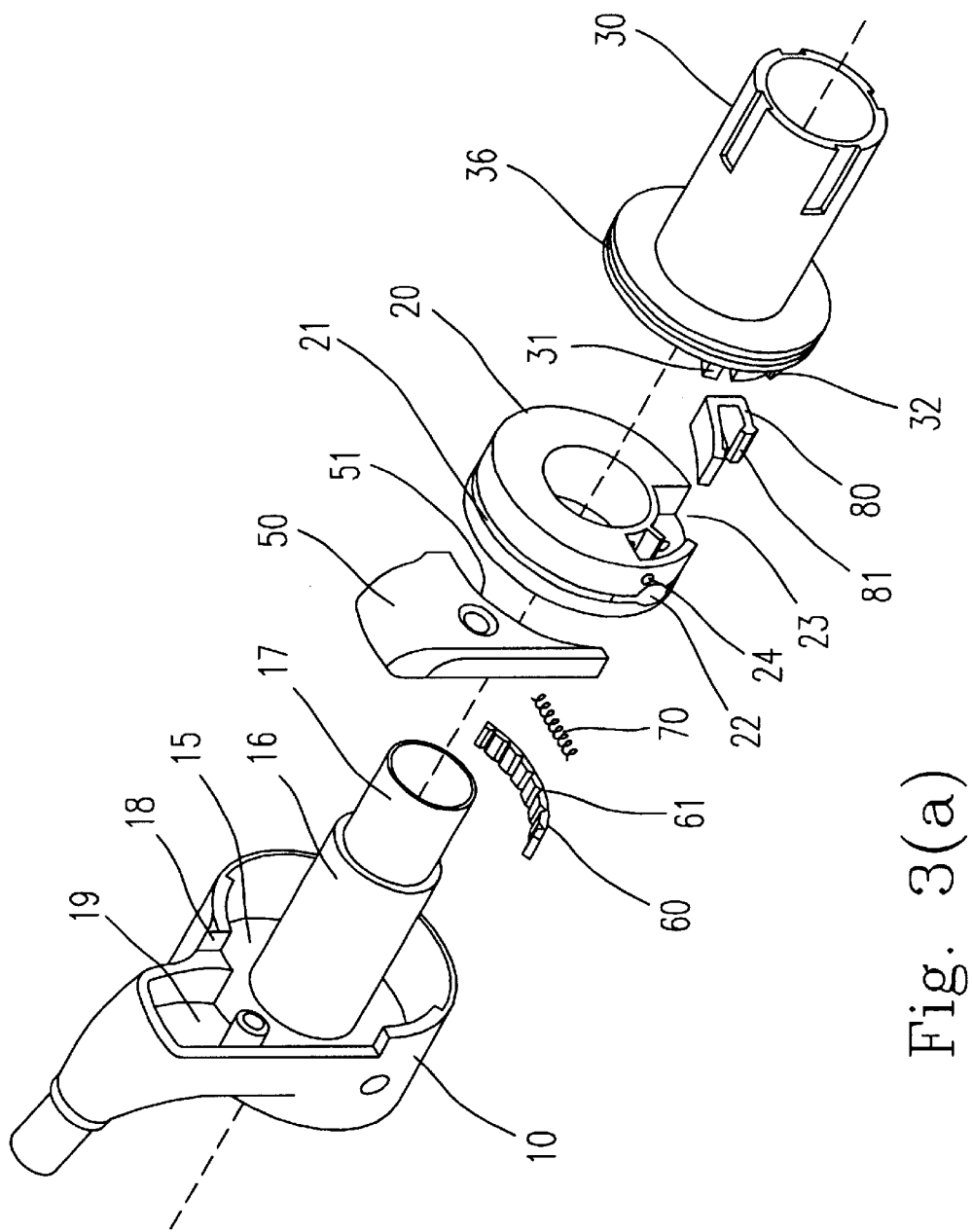
FIG. 3(a) is a schematic view showing the elements of a module for fixing positions according the preferred embodiment of the present invention.
Figure 3B:
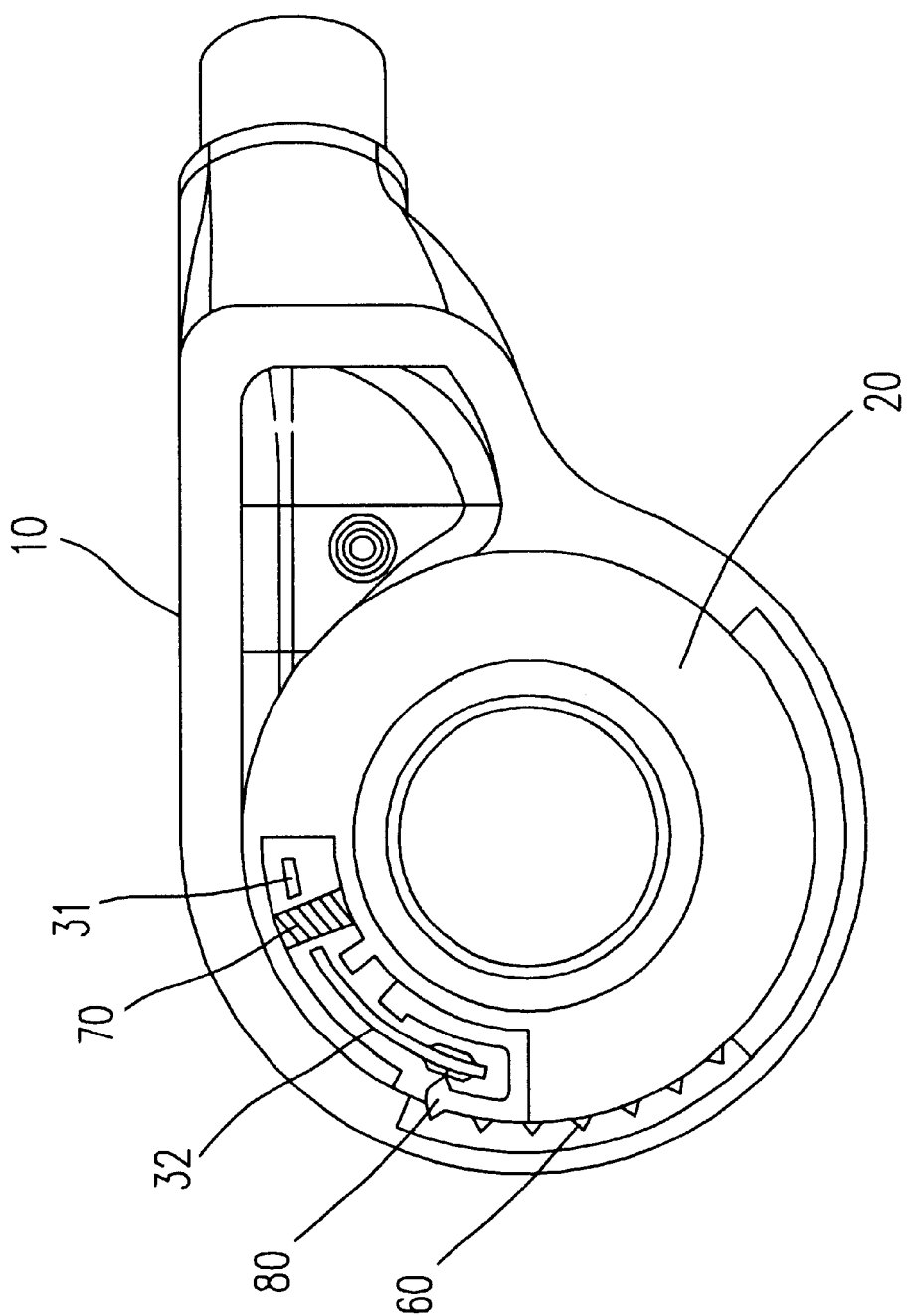
FIG. 3(b) is a schematic view showing the assembly of the elements in FIG. 3(a) according to the preferred embodiment of the present invention.

Please refer to FIGS. 3(a) and (b) The assembly of the elements shown in FIG. 3(a) is illustrated as follows. A guiding ring-receptacle 15 is disposed on the fixing main body 10. A cylinder 16 and a cylinder 17 disposed in the guiding ring-receptacle 15 are respectively slipped into the guiding ring 20 and the operating grip 30. A receiver 18 disposed in the periphery of the guiding ring-receptacle 15 for receiving a positioning slide 60. The guiding ring 20 has a guiding notch 23 for receiving a resilient steel plate 80, a projection 31 and a positioning unit 32. A spring slot 24 is disposed on the guiding notch 23. When the cylinder 16 and the cylinder 17 is slipped into the guiding ring 20, a return spring 70 would be limited in the guiding notch 23. Then, the operating grip 30 is slipped into the cylinder 17, and the projection 31 and the positioning unit 32 are positioned in the guiding notch 23. The flange 51 of the grip-fixing element 50 is lodged in the annular slot 36 of the operating grip 30, and the grip-fixing element 50 is fastened to a square-shaped slot 19 by a screw. Thus, the operating grip 30 would not fall off when the operating grip 30 is twisted. The resilient steel plate 80 is U-shaped and a polyhedron-formed controlling pawl 81 is disposed on one end of the resilient steel plate 80. Specifically, the polyhedron-formed controlling pawl 81 is used for lodging in the notches 61 on the positioning slide 60 to position gears.

Figure 4:
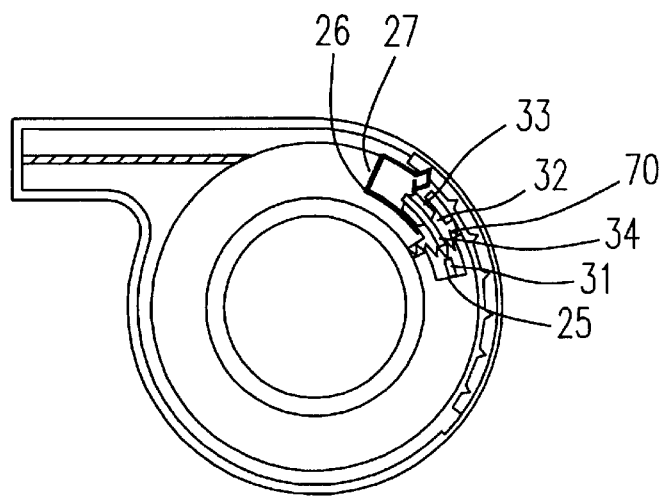
FIG. 4 is a schematic view showing the gear-shifter in the state of up-shift according to the preferred embodiment of the present invention.
Figure 5:
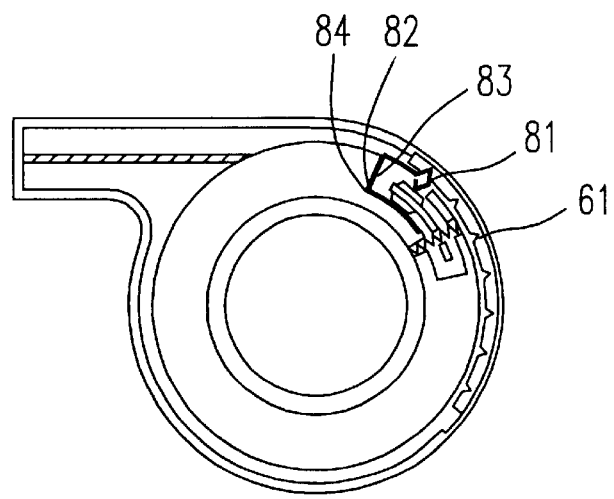
FIG. 5 is a schematic view showing the gear-shifter in the positioned state according to the preferred embodiment of the present invention.

Please refer to FIG. 4 showing the gear-shifter in the state of up-shift and FIG. 5 showing the gear-shifter in the positioned state. For performing the motion of up-shift, the operating grip 30 is twisted, and the positioning unit 32 would press return spring 70 to deform the return spring 70, and then the projection 31 is against the a wall 25 of the guiding notch. Thus, the guiding ring is driven to rotate, and a bend 26 of the bottom of the guiding ring is against an end 82 of the U-shaped resilient steel plate. Furthermore, the positioning lump 33 of the positioning unit 32 is departed from the controlling pawl 81, so that the controlling pawl 81 is not limited in the notch 61 and has space for moving. The controlling pawl 61 takes the bend 84 as a fulcrum to pivot to different notches 61 by the twisting force applied on the operating grip, and then the motion of the up-shift is achieved. In the meanwhile, the twisting force applied on the operating grip by the user could be relieved, and the contacting portion 34 is pushed by resilience of the deformed return spring 70 to slightly and reversely twist the operating grip. Thus, the positioning lump 33 is against the controlling pawl 81 for correctly positioning.

Figure 6:
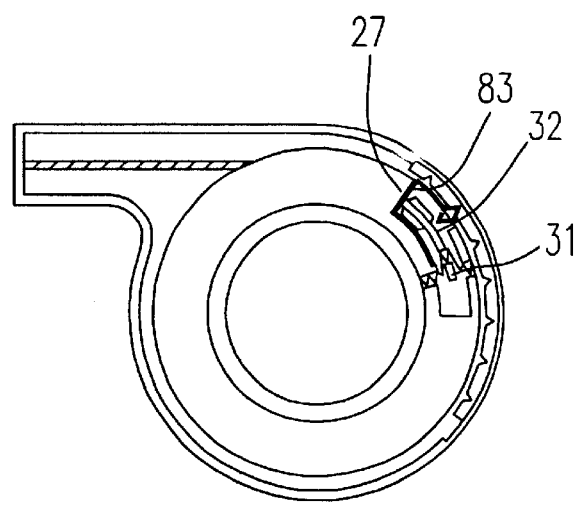
FIG. 6 is a schematic view showing the gear-shifter in the state of down-shift according to the preferred embodiment of the present invention.

Please refer to FIG. 6 showing the gear-shifter in the state of down-shift. For performing the motion of down-shift, the operating grip is twisted, and the projection 31 would press return spring 70 to deform the return spring 70, and then the positioning unit 32 is against the a internal part 83 of the resilient steel plate and a wall 27 of the guiding notch for driving the guiding ring to rotate. Furthermore, the positioning lump 33 of the positioning unit 32 is departed from the controlling pawl 81, so that the controlling pawl 81 is not limited in the notch 61 and has space for moving. The controlling pawl 61 takes the bend 84 as a fulcrum to pivot to different notches 61 by the twisting force applied on the operating grip, and then the motion of down-shift is achieved. In the meanwhile, the twisting force applied on the operating grip by the user could be relieved, and the projection 31 is pushed by resilience of the deformed return spring 70 to slightly and reversely twist the operating grip. Thus, the positioning lump 33 is against the controlling pawl 81 for correctly positioning. Therefore, the gear-shifter provided by the present invention has a resilient stool plate responding to different operation strength for the motions of up-shift and down-shift.

Figure 7:
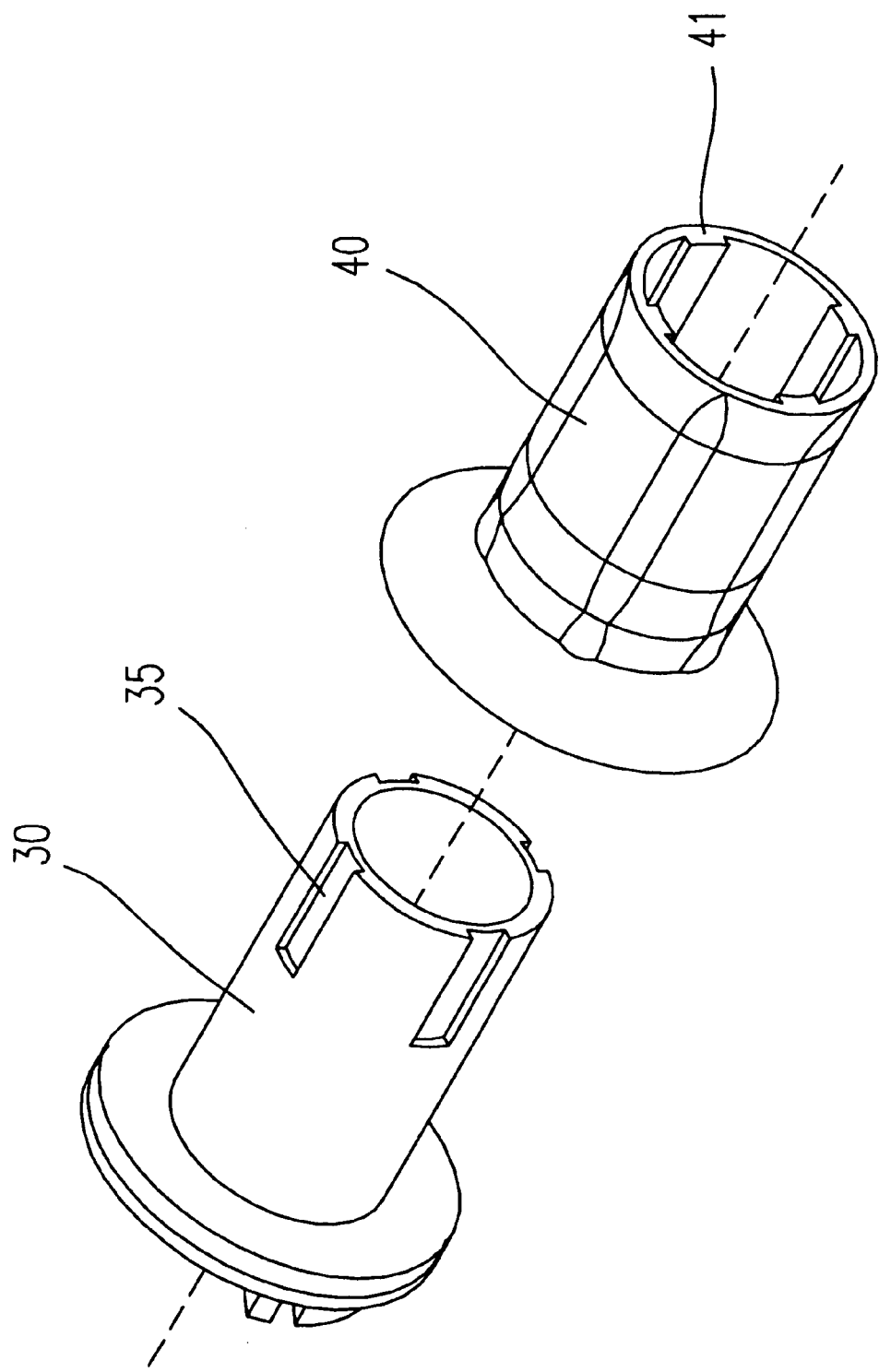
FIG. 7 is a schematic view showing the operating grip and the rubber cover according to the preferred embodiment of the present invention.

Please refer to FIG. 7 showing the operating grip 30 and the rubber cover 40. The external part of the rubber cover 40 is handled by the users so that the design of the rubber cover 40 should be considered about the friction and the comfort in operation. The internal part of the rubber cover 40 has protruding portions 41 for lodging in fixing slots 35 of the operating grip 30 to tightly combine the operating grip 30 and the cover rubber 40. Thus, when the gear-shifter is used by the user, the twisting force applied on the rubber cover 40 by the user could be successfully transferred to the operating grip 30, and the rubber cover 40 would not fall from the operating grip 30. In addition, the number of the protruding portions 41 and the fixing slots 35 should be considered.

Figure 8:
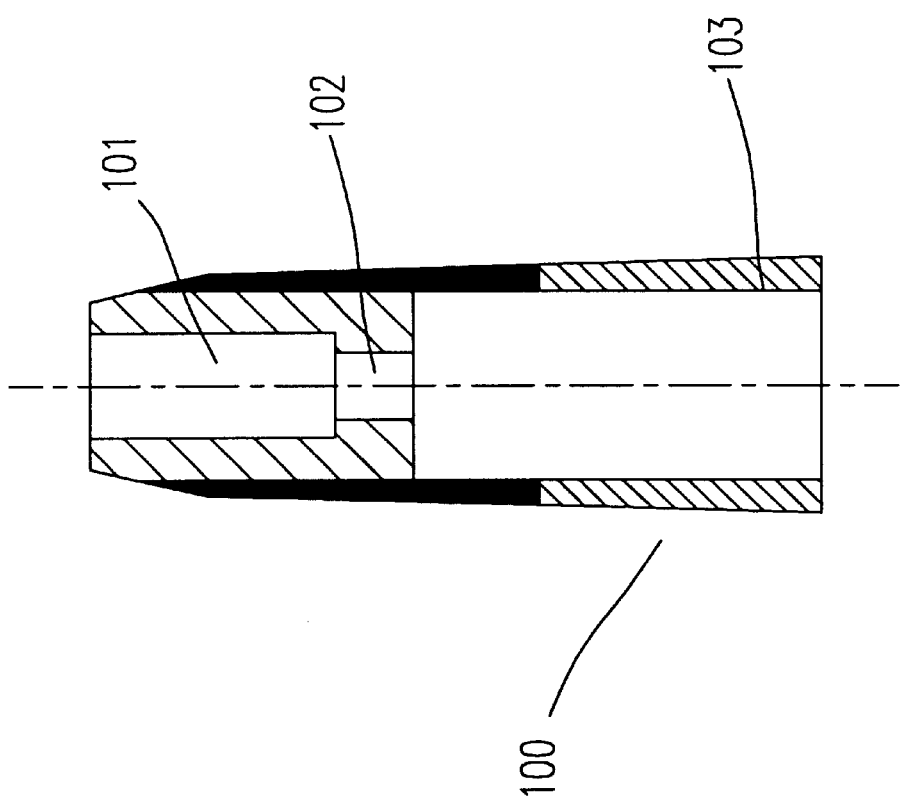
FIG. 8 is a schematic view showing the cable trimmer according to the preferred embodiment of the present invention.

Please refer to FIG. 8 showing the cable trimmer 100. When the cable is pulled from the second hole 14 of the fixing main body 10, the cable is pushed into the cable trimmer 100. The cable trimmer has an internal threads 103 for suiting external threads of the second hole, a receiving hole 101 for receiving a conducting tube, and an aperture 12 for the cable passing through. Since an assembly error could occur in assembling the cable in the gear-shifter or the cable is over pulled in the operation, the departure of positioning would occur. Therefore, the cable trimmer of the present invention could be used for axially adjusting the cable and maintaining the proper tension of the cable.

Figure 9:
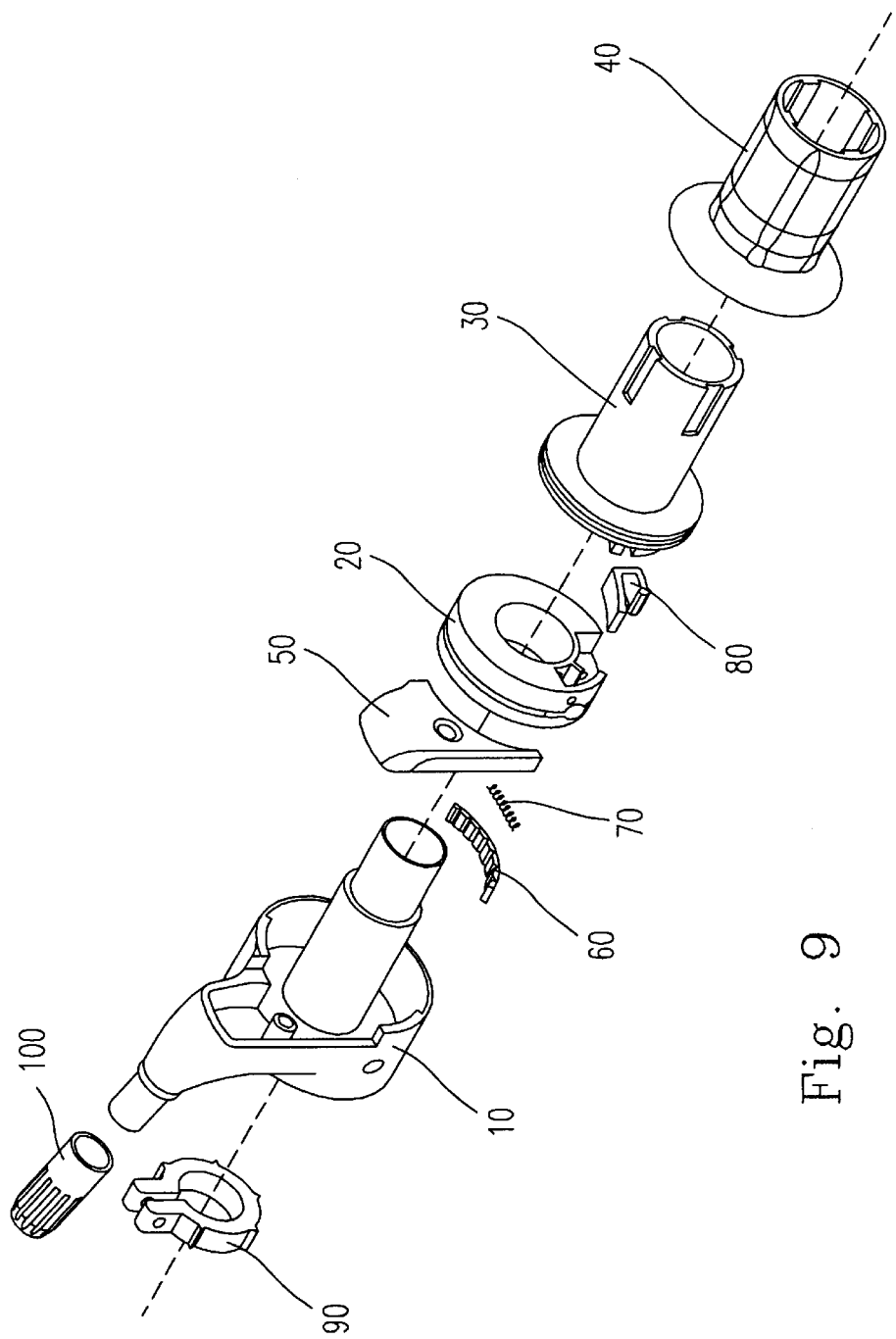
FIG. 9 is a schematic view showing the elements of the gear-shifter according to the preferred embodiment of the present invention.

Please refer to FIG. 9 showing the elements of the grip gear-shifter provided by the present invention. The number of the element of the grip gear-shifter provided by the present invention is less than tat of the prior art. The axial assembly of the elements is simple and convenient.

The present invention provide a grip gear-shifter having less elements, simple positioning mechanism, convenience for assembling and changing elements, and properties of high stability and labor-saving.

Therefore, the grip gear-shifter of the present invention could overcome the drawbacks of the conventional gear-shifters.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. A grip gear-shifter for being used in actuating a derailleur of a bicycle, comprising:
   a return spring;
   a resilient steel plate having a polyhedron-formed controlling pawl;

a guiding ring having a guiding notch for guiding a cable;

a first module for lodging and positioning said controlling pawl when said bicycle is in the state of shifting gears; and a second module having a projection and a positioning unit for operating in coordination with said return spring and said resilient steel plate, thereby forming a relative motion of said resilient steel plate and said first module to correctly shift gears when said bicycle is in said state of shifting gears, including:

an operating grip having plural fixing slots for being used in operations of up-shift and down-shift, wherein said operating grip comprises said projection and said positioning unit for pressing said return spring to form a resilience due to the deformation of said return spring, wherein said positioning unit comprises a contacting portion and a positioning lump for said controlling pawl not being limited in said notch and having space to move when said grip-shifter in said state of shifting gears.

2. The grip gear-shifter according to claim 1, wherein said resilient steel plate is U-shaped.

3. The grip gear-shifter according to claim 1, wherein said second module further comprises a rubber cover for covering said operating grip handled by a user.

4. The grip gear-shifter according to claim 3, wherein said rubber cover has plural protruding portions for suiting said fixing slots of said operating grip to prevent said rubber cover from falling from said operating grip when said operating grip covered by said rubber cover is twisted by said user.

5. The grip gear-shifter according to claim 1, wherein said first module comprises:

a fixing main body for securing said grip gear-shifter to said bicycle;

a grip-fixing element having a flange for lodging in an annular slot of said operating grip to fix said operating grip;

a positioning slide having plural notches for being lodged by said controlling pawl and positioning said controlling pawl when said bicycle is in said state of shifting gears;

a clamping element for suiting said fixing main body and fixing said fixing main body to a handlebar of said bicycle; and a cable trimmer disposed at a wound end of said cable for adjusting the tension of said cable.

6. The grip gear-shifter according to claim 5, wherein said fixing main body further has a first hole and a second hole thereon for conveniently assisting windup of said cable, thereby said cable is pulled through said first hole, pushed in said guiding notch and further pulled from said second hole, wherein said second hole has external threads.

7. The grip gear-shifter according to claim 6, wherein said fixing main body further comprises:

a first cylinder and a second cylinder for respectively slipping into said guiding ring and said operating grip;

a receiver for receiving said positioning slide; and a slot for receiving said grip-fixing element.

8. The grip gear-shifter according to claim 6, wherein said cable trimmer has internal threads for screwing in coordination with said external threads of said second hole, thereby adjusting said tension of said cable.

9. A grip gear-shifter for being used in actuating a derailleur of a bicycle, comprising:

a return spring;

a resilient steel plate having a polyhedron-formed controlling pawl;

a guiding ring having a guiding slot and a circular indent for guiding and receiving a cable, a spring slot for receiving said return spring and a guiding notch for receiving said resilient steel plate;

a first module for lodging and positioning said controlling pawl when said bicycle is in the state of shifting gears; and a second module having a projection and a positioning unit for operating in coordination with said return spring and said resilient steel plate, thereby forming a relative motion of said resilient steel plate and said first module to correctly position said derailleur when said bicycle is in said state of shifting gears, including:

an operating grip having plural fixing slots for being used in operations of up-shift and down-shift, wherein said operating grip comprises said projection and said positioning unit for pressing said return spring to form a resilience due to the deformation of said return spring, wherein said positioning unit comprises a contacting portion and a positioning lump for said controlling pawl not being limited in said notch and having space to move when said grip-shifter in said state of shifting gears.

10. The grip gear-shifter according to claim 9, wherein said second module further comprises a rubber cover for covering said operating grip handled by a user.

11. The grip gear-shifter according to claim 9, wherein said first module comprises:

a fixing main body for securing said grip gear-shifter to said bicycle;

a grip-fixing element having a flange for lodging in an annular slot of said operating grip to fix said operating grip;

a positioning slide having plural notches for being lodged by said controlling pawl and positioning said controlling pawl when said bicycle is in said state of shifting gears;

a clamping element for suiting said fixing main body and fixing said fixing main body to a handlebar of said bicycle; and a cable trimmer disposed at a wound end of said cable for adjusting the tension of said cable.

12. A grip gear-shifter for being used in actuating a derailleur of a bicycle, comprising:

a return spring;

a resilient steel plate having a polyhedron-formed controlling pawl;

a guiding ring having a guiding slot and a circular indent for guiding and receiving a cable, a spring slot for receiving said return spring and a guiding notch for receiving said resilient steel plate;

an operating grip having plural fixing slots for being used in operations of up-shift and down-shift, wherein said operating grip comprises a projection and a positioning unit for pressing said return spring to form a resilience due to the deformation of said return spring, wherein said positioning unit comprises a contacting portion and a positioning lump for said controlling pawl not being limited in said notch and having space to move when said grip-shifter in said state of shifting gears;

a rubber cover for covering said operating grip handled by a user;

a fixing main body for securing said grip gear-shifter to said bicycle;

a grip-fixing element having a flange for lodging in an annular slot of said operating grip to fix said operating grip;

a positioning slide having plural notches for being lodged by said controlling pawl and positioning said controlling pawl when said bicycle is in said state of shifting gears;

a clamping element for suiting said fixing main body and fixing said fixing main body to a handlebar of said bicycle; and a cable trimmer disposed at a wound end of said cable for adjusting the tension of said cable.

13. The grip gear-shifter according to claim 12, wherein said fixing main body further has a first hole and a second hole thereon for conveniently assisting windup of said cable, thereby said cable is pulled through said first hole, pushed in said guiding notch and further pulled from said second hole, wherein said second hole has external threads.

14. The grip gear-shifter according to claim 13, wherein said cable trimmer has internal threads for screwing in coordination with said external threads of said second hole, thereby adjusting said tension of said cable.

15. The grip gear-shifter according to claim 12, wherein said fixing main body further comprises:

a first cylinder and a second cylinder for respectively slipping into said guiding ring and said operating grip;

a receiver for receiving said positioning slide; and a slot for receiving said grip-fixing element.

* * * * *